Nov. 30, 1937. W. A. ABEGG 2,100,621
REAMER
Filed Nov. 14, 1936
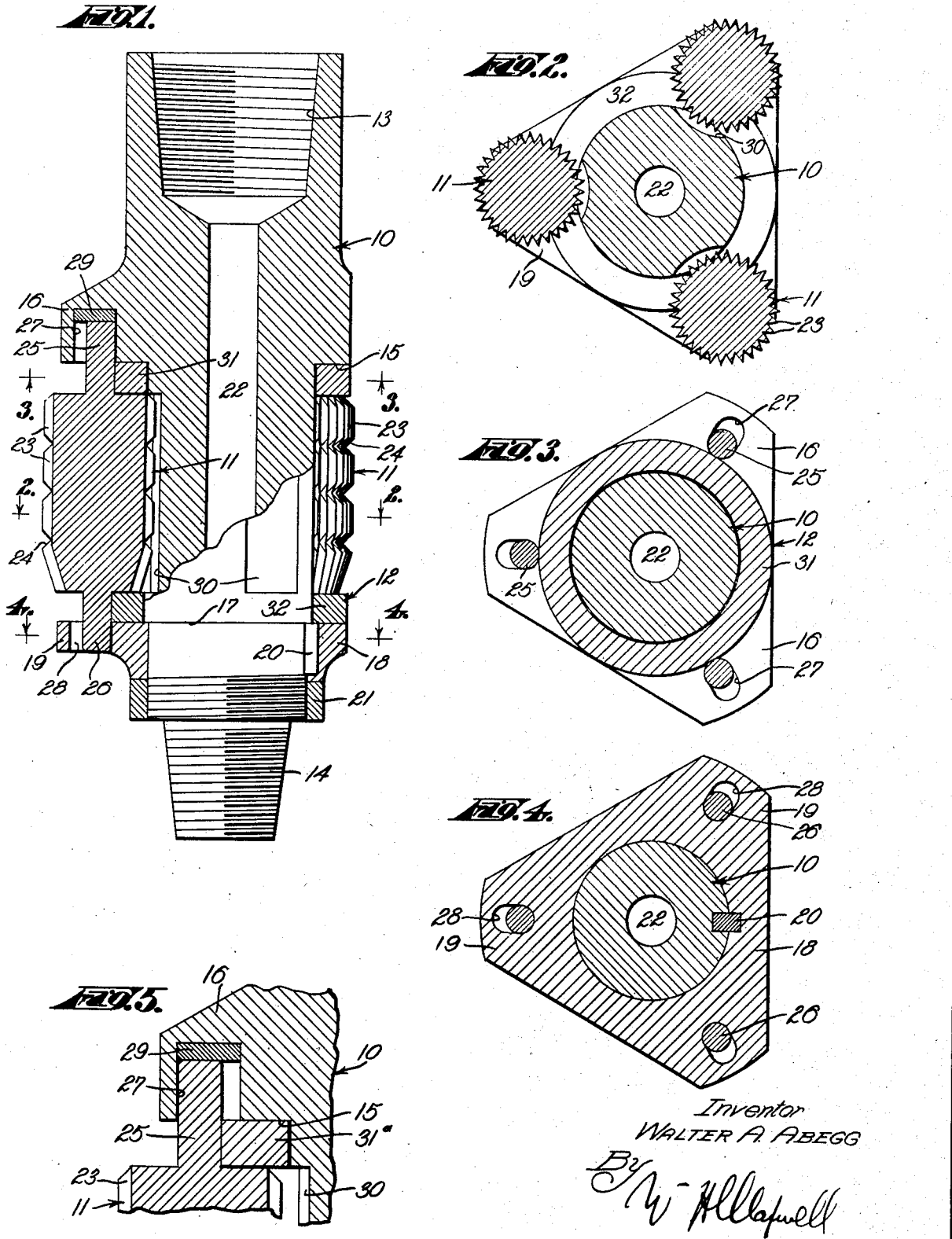
Inventor
WALTER A. ABEGG
By
His Attorney Patented Nov. 30, 1937

2,100,621

UNITED STATES PATENT OFFICE 2,100,621

REAMER

Walter A. Abegg, Los Angeles, Calif., assignor to Globe Oil Tools Company, Los Nietos, Calif., a corporation of California Application November 14, 1936, Serial No. 110,822

9 Claims. (Cl. 255—73)

This invention relates to a well drilling tool and relates more particularly to a reamer for use in the rotary method of well drilling. A general object of this invention is to provide a practical, effective well reamer whose effective diameter may be readily changed while employing the same cutters or cutters of the same diameter.

Another object of this invention is to provide a well reamer embodying roller reaming cutters having shafts or trunnions supported on bearing rings which may be replaced by bearing rings of different diameters, thereby changing the effective diameter of the reamer.

Another object of this invention is to provide a reamer of the character mentioned in which the bearing rings surround the body or shank to present large bearing surfaces and to rotate so that they constantly present new bearing areas for engagement by the cutter trunnions thereby maintaining the reamer at the selected gauge for a long period.

Another object of this invention is to provide a well reamer of the character mentioned in which the cutters may be easily and quickly replaced when worn and in which the bearing rings may be readily replaced when it is desired to change the gauge or effective diameter of the reamer.

A further object of the invention is to provide a reamer of the character mentioned in which the body or shank is subjected to little or no wear due to the rotation of the cutters.

The various objects and features of my invention will be fully understood from the following detailed description of a typical preferred form and application of the invention, throughout which description reference is made to the accompanying drawing, in which:

Fig. 1 is a longitudinal detailed sectional view of the reamer provided by this invention showing a cutter and a portion of the shank in side elevation. Figs. 2, 3 and 4 are transverse detailed sectional views taken as indicated by lines 2—2, 3—3 and 4—4, respectively, on Fig. 1, and Fig. 5 is an enlarged fragmentary vertical sectional view illustrating the mounting of one of the cutter trunnions having a bearing ring of larger diameter.

The improved well reamer of the present invention includes, generally, a body or shank 10, roller cutters 11 spaced about the shank 10, and means 12 rotatably supporting the cutters 11 and capable of mounting the cutters at greater or less distances from the axis of the shank 10 to change the effective diameter of the reamer.

The shank 10 is adapted to be connected in a rotary well drilling string. In practice the shank 10 may be an elongate member generally cylindrical in shape. Suitable means are provided at the ends of the shank 10 for connecting it in the drilling string. In the particular case illustrated a screw threaded socket 13 is provided in the upper end of the shank 10 and a tapered threaded pin 14 is provided on the lower end of the shank 10 for connecting the shank in the drilling string. In accordance with the invention the shank 10 is provided with an annular downwardly facing shoulder 15 spaced some distance below its upper end. Three circumferentially spaced wings or ears 16 project outwardly from the shank 10 above the shoulder 15. The lower sides of the ears 16 may be in the same plane as the shoulder 15. The outer ends of the ears 16 may be suitably rounded and the sides of the ears may be tangential with respect to a circle whose center lies in the axis of the shank 10 to merge one with the other. The lower portion of the shank 10 immediately above the pin 14 is reduced in diameter providing the shank with a downwardly facing annular shoulder 17.

The invention includes an annular member 18 removably arranged around the reduced lower portion of the shank to bear upwardly against the shoulder 17. The member 18 is provided with three circumferentially spaced ears 19 similar to the above described ears 16. The member 18 is held against rotation by a key 20 and is positioned so that its ears 19 are in vertical alignment with the ears 16. A nut 21 is threaded on the shank 10 to clamp the member 18 upwardly against the shoulder 17. A central longitudinal fluid passage 22 extends through the shank 10 from its socket 13 to the lower end of the pin 14 to conduct the circulation fluid pumped through the drilling string.

The cutters 11 for acting on the side wall of the well bore to ream the same are in the nature of rotatable roller cutters. The particular embodiment of the invention illustrated includes three cutters 11, there being a cutter 11 rotatably supported between each pair of vertically aligned ears 16 and 19. The three cutters 11 may be of the same diameter and length. The cutters 11 are generally cylindrical and their lower end portions may be tapered downwardly and inwardly. The upper and lower ends of the cutters 11 are preferably flat and normal relative to the longitudinal axes of the cutters. The cutters 11 are provided with peripheral cutting teeth 23 for acting on the side wall of the well bore. The teeth 23 may be axial and may extend between the upper and lower ends of the cutters. In the structure illustrated the teeth 23 of the cutters are interrupted by annular circumferential grooves 24. In accordance with the invention shafts or trunnions 25 project from the upper ends of the cutters 11 and similar, although somewhat shorter trunnions 26 project from the lower ends of the cutters. The trunnions 25 and 26 may be integral parts of the cutters 11 as illustrated, or may be separately formed parts suitably rigidly secured to the cutters.

The means 12 provides or includes sockets 27 in the under sides of the ears 16 to receive the cutter trunnions 25 and openings 28 in the ears 19 to receive the lower cutter trunnions 26. In accordance with the invention the sockets 27 and the openings 28 are in the form of slots being elongated in cross section radially of the longitudinal axis of the shank 10. This shape or formation of the sockets 27 and the openings 28 is important as it allows the cutters 11 to be shifted or adjusted radially to vary the effective diameter of the reamer. Thrust plates 29 may be arranged in the upper ends of the sockets 27 to receive the end thrusts from the upper ends of the trunnions 25. It is to be understood that the trunnions 25 and 26 do not rotatably bear in the sockets 27 and the openings 28 to support the cutters 11 against the inward operating thrusts. The sockets 27 and the openings 28 receive the trunnions 25 and 26, respectively, to maintain the cutters 11 in their proper operative positions. It may be found necessary or desirable to provide longitudinal grooves 30 in the intermediate portion of the shank 10 to assure proper clearance between the cutters 11 and the shank when the trunnions 25 and 26 are in the innermost portions of the sockets 27 and the openings 28. The ends of the grooves 30 are preferably spaced from the shoulders 15 and 17 of the shank.

The adjustable cutter mounting means 12 further includes a bearing ring 31 rotatably surrounding the shank 10 below the shoulder 15 to support the cutter trunnions 25 against inward thrusts and a similar bearing ring 32 rotatably surrounding the shank 10 above the shoulder 17 and the member 18 to rotatably support the cutter trunnions 26 against the inward operating forces. The bearing rings 31 and 32 may be simple annular parts of square or rectangular cross section and may be identical. The rings 31 and 32 are freely rotatable on the shank 10 so that they may be rotated by the trunnions 25 and 26 of the rotating cutters 11. It is to be understood that the rotative engagement between the trunnions 25 and the ring 31 and between the trunnions 26 and the ring 32 supports the cutters 11 for reaming engagement with the side wall of the well bore so that the trunnions do not bear on the inner walls of the sockets 27 and the openings 28 for the transmission of these forces. The rotative engagement between the trunnions 25 and the ring 31 and the trunnions 26 and the ring 32 results in rotation of the rings so that the rings are worn evenly and present long or large bearing surfaces for cooperating with the trunnions. Further, the rotating bearing rings 31 and 32 operate to gear together the several cutters 11 assuring the rotation of the cutters about their individual axes so that the cutters do not drag and become flattened on one side due to their engagement with the earth formation.

It is an important feature of the invention that the bearing rings 31 and 32 may be replaced by similar rings of different external diameters to change the effective diameter of the reamer. The sockets 27 and the openings 28 being in the form of radially elongated slots allow the trunnions 25 and 26 to assume positions at various distances from the axis of the shank 10 when bearing rings 31, 31ᵃ etc. and 32, 32ᵃ etc. of different external diameter are employed. Thus, as illustrated in Figs. 1, 3 and 4 of the drawing, rings 31 and 32 of relatively small diameter are employed and the trunnions 25 and 26 are received in the inner portions of the sockets 27 and the openings 28, respectively, whereas Fig. 5 of the drawing illustrates a bearing ring 31ᵃ of greater external diameter surrounding the shank 10 rotatably supporting a trunnion 25 in the outer portions of a socket 27 whereby the reamer has a much larger effective diameter. The bearing rings are provided in sets of two rings each, the rings of each set being of the same size. To change the effective diameter of the reamer its bearing rings are replaced by a set of bearing rings having a different external diameter than the set replaced. It is to be understood that the trunnions 25 and 26 bear on the bearing rings 31 and 32 regardless of the outside diameters of the bearing rings so that the shank 10 is not subjected to excessive wear due to rotation of the cutters 11. It is to be particularly noted that the same cutters 11 or replacement cutters 11 of the same diameter may be employed with bearing rings 31, 31ᵃ etc. and 32, 32ᵃ etc. of different external diameters when the effective diameter of the reamer is to be changed, as just described.

It is believed that the operation of the reamer provided by the present invention will be readily understood from the following detailed description. When the reamer is assembled for operation it is provided with bearing rings 31, 31ᵃ, etc. and 32, 32ᵃ, etc. operable to rotatably support the cutters 11 at the selected distance from the longitudinal axis of the shank 10 so that the reamer has the desired effective diameter. The shank 10 is adapted to be connected in a rotary well drilling string and the reamer is adapted to be rotated in the well bore in the well known manner. During rotation of the drilling string the cutters 11 contact the side wall of the well bore so that they are made to turn about their axes. This individual rotation of the cutters 11 results in rotation of the bearing rings 31 and 32 about the shank 10. The principal thrusts or the inward thrusts imposed on the cutters 11 are transmitted to the bearing rings 31 and 32 by the trunnions 25 and 26, respectively. Thus the cutters 11 are rotatably supported without subjecting the shank 10 to excessive wear. The engagement of the trunnions 25 and 26 with the bearing rings 31 and 32, respectively, results in turning of the bearing rings so that they present their entire bearing areas for contact by the trunnions. In this manner the bearing rings are very long wearing and maintain the reamer at the selected gauge for a long period. The rotating bearing rings 31 and 32 may serve to assure the individual rotation of the cutters 11 so that the cutters do not drag and become flattened through their engagement with the earth formation.

The effective diameter or the reaming diameter of the tool may be readily changed by replacing the bearing rings 31, 31ᵃ etc. and 32, 32ᵃ etc. with similar rings of a different external diameter. To replace the bearing rings 31, 31ᵃ etc. and 32, 32ᵃ etc. and to replace the cutters 11 when necessary, the nut 21 is unthreaded and the member 18 is slid from the shank 10. This permits the easy removal of the cutters 11 and the bearing rings 31 and 32. When bearing rings of larger external diameter than the bearing rings illustrated in Fig. 1, are assembled on the shank 10 they hold or support the trunnions 25 and 26 at a greater distance from the axis of the shank 10. This, of course, increases the effective diameter of the reamer. It will be observed that the diameter of the reamer may be changed in this manner without employing larger cutters or cutters of a different diameter. The cutters 11 and the bearing rings 31, 31a, etc. and 32, 32a, etc. for supporting the cutters at the selected distances from the axes of the shank are simple and inexpensive and may be easily and quickly removed and replaced.

Having described only a typical preferred form and application of my invention, I do not wish to be restricted or limited to the specific details herein set forth, but wish to reserve to myself any variations or modifications that may appear to those skilled in the art or fall within the scope of the following claims.

Having described my invention, I claim:

1. A well reamer including, a shank, parts on the shank having openings elongated radially with respect to the longitudinal axis of the shank, a cutter between said parts having trunnions extending into said openings, the trunnions being adjustable in the said openings, and bearing members on the shank cooperating with the trunnions to support the cutter against inward forces.

2. A well reamer including, a shank, parts on the shank having openings elongated radially with respect to the longitudinal axis of the shank, a cutter between said parts having trunnions extending into said openings, the trunnions being adjustable in the said openings, and spaced rings around the shank cooperating with the trunnions to support the cutter against inward forces.

3. A well reamer including, a shank, parts on the shank having openings elongated radially with respect to the longitudinal axis of the shank, a cutter between said parts having trunnions extending into said openings, the trunnions being adjustable radially in the openings, and rotatable bearing rings surrounding the shank to cooperate with the trunnions and support the cutters against inward forces.

4. A well reamer including, a shank, parts on the shank having openings elongated radially with respect to the longitudinal axis of the shank, a cutter between said parts having trunnions extending into said openings, the trunnions being adjustable in said openings, and spaced rotatable bearing rings surrounding the shank and receiving the inward thrusts from the trunnions to rotatably support the cutter and determine its radial position.

5. A well reamer including, a shank, longitudinally aligned pairs of spaced projecting parts on the shank, said parts having openings elongated radially relative to the longitudinal axis of the shank, cutters arranged between said parts and having trunnions extending into said openings, the trunnions being adjustable in said openings, and replaceable members on the shank engaged by the trunnions to support the cutters against inward pressures and determine their radial positions.

6. A well reamer including, a shank, longitudinally aligned pairs of spaced projecting parts on the shank, said parts having openings elongated radially relative to the longitudinal axis of the shank, cutters arranged between said parts and having trunnions extending into said openings, the trunnions being adjustable in said openings, and replaceable members surrounding the shank at spaced planes and engaged by the trunnions to support the cutters against inward forces and determine their radial positions.

7. A well reamer including, a shank, longitudinally aligned pairs of spaced projecting parts on the shank, said parts having openings elongated radially relative to the longitudinal axis of the shank, cutters arranged between said parts and having trunnions extending into said openings, the trunnions being adjustable radially in said openings, and rotatable bearing rings surrounding the shank and engaged by the trunnions to support the cutters against inward forces and to determine their active radial positions.

8. A rotary well reamer including, a shank, circumferentially spaced ears on the shank, a removable member surrounding the shank and having ears aligned with and spaced from the first mentioned ears, the first and second mentioned ears having radially elongate axially extending openings, a roller cutter arranged between each pair of aligned ears, trunnions on the cutters extending into said openings, the trunnions being adjustable radially in said openings, and replaceable bearing parts surrounding the shank to be engaged by the trunnions to support the cutters against inward forces and to determine their active radial positions.

9. A rotary well reamer including, a shank, circumferentially spaced ears on the shank, a removable member surrounding the shank and having ears aligned with and spaced from the first mentioned ears, the first and second mentioned ears having radially elongate axially extending openings, a roller cutter arranged between each pair of aligned ears, trunnions on the cutters extending into said openings, the trunnions being radially adjustable in the said openings, and removable rotatable bearing rings surrounding the shank to be engaged by the trunnions to support the cutters against inward forces and to locate the cutters radially.

WALTER A. ABEGG.